United States Patent
Bono et al.

(10) Patent No.: US 10,326,837 B1
(45) Date of Patent: Jun. 18, 2019

(54) DATA STORAGE SYSTEM PROVIDING UNIFIED FILE/BLOCK CLOUD ACCESS

(71) Applicant: EMC IP Holding Company LLC, Hopkinton, MA (US)

(72) Inventors: Jean-Pierre Bono, Westborough, MA (US); Wai C. Yim, Merrimack, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 180 days.

(21) Appl. No.: 15/278,605

(22) Filed: Sep. 28, 2016

(51) Int. Cl.
*H04L 29/08* (2006.01)
*H04L 29/06* (2006.01)

(52) U.S. Cl.
CPC ...... *H04L 67/1095* (2013.01); *H04L 67/1097* (2013.01); *H04L 67/42* (2013.01)

(58) Field of Classification Search
CPC .. H04L 67/1095; H04L 67/1097; H04L 67/42
See application file for complete search history.

(56) References Cited

U.S. PATENT DOCUMENTS

| | | | |
|---|---|---|---|
| 8,849,759 B2 | 9/2014 | Bestler et al. | |
| 9,400,802 B2* | 7/2016 | Slik | G06F 17/30238 |
| 9,454,326 B1* | 9/2016 | Bono | G06F 3/065 |
| 9,740,435 B2 | 8/2017 | Dolce et al. | |
| 9,773,042 B1* | 9/2017 | Li | G06F 17/30516 |
| 2005/0018709 A1* | 1/2005 | Barrow | G06F 3/0605 370/465 |
| 2006/0190552 A1* | 8/2006 | Henze | H04L 29/12009 709/216 |
| 2013/0185258 A1* | 7/2013 | Bestler | G06F 17/30197 707/638 |
| 2016/0173603 A1* | 6/2016 | Ainscow | G06F 3/06 707/827 |
| 2017/0366606 A1* | 12/2017 | Ben-Shaul | H04L 67/1008 |
| 2018/0018261 A1* | 1/2018 | Vekiarides | G06F 12/10 |

* cited by examiner

*Primary Examiner* — Michael A Keller
*Assistant Examiner* — Jsing Forng Lin
(74) *Attorney, Agent, or Firm* — BainwoodHuang

(57) ABSTRACT

A data storage system includes local data storage devices, network interface circuitry providing an interface to a cloud storage service, and processing circuitry configured and operative to: (1) form a first storage pool and associated first storage objects using first pool units of storage from the first storage pool, the first storage pool using the local data storage devices for underlying real storage, the first storage objects including both file-oriented objects and block-oriented objects; (2) form a second storage pool and associated second storage objects using second pool units of storage from the second storage pool, the second storage pool using the cloud storage service for underlying real storage; and (3) execute one or more of a tiering process and a backup process by which the first storage objects are migrated or copied to corresponding ones of the second storage objects for persistent storage by the cloud storage service.

20 Claims, 4 Drawing Sheets

DATA STORAGE SYSTEM PROVIDING UNIFIED FILE/BLOCK CLOUD ACCESS

BACKGROUND

The invention is related to the field of data storage systems used in data processing systems, and in particular to data storage systems providing extended services such as tiering, backup, and snapshot functionality for example.

SUMMARY

As cloud storage becomes more commonplace and price competitive, computer system owners and administrators may want the flexibility to leverage cloud storage for "cold", or infrequently used, data. In many cases, a computer system includes storage objects of different types, notably both file-type (e.g., file systems and constituent files) and block-type (e.g., volumes or logical storage devices (LUNs)). Existing approaches to using cloud storage employ separate block-based and file-based solutions, and thus a computer system owner/operator must up and operate both types of infrastructures to get the benefits of block and file tiering and archiving.

Ideally, this process is seamless where the data is accessible using the same interfaces, with possibly higher latency, and with the movement of the data automated for ease of management.

An approach is to use a storage pool where the underlying storage is written and read from the cloud. It is also possible to have a persistent cache locally to minimize the latency of data transfers to and from the cloud. Storage objects are defined on this storage pool that acts as a target for the data destined for the cloud. The cloud access methods are hidden within the storage pool backend. This approach is a unified approach that can work for both block access or when archiving a file or an entire file system.

A disclosed technique provides both individual file level and block archiving using the same cloud enabled storage pool. This approach gives a computer system owner/operator maximum flexibility in archiving and access policies while keeping the setup and management to a minimum. In the block use case, a LUN is created in the cloud enabled storage pool as a target of the block data archiving. In the file use case, a file system is created in the cloud enabled storage pool as a target of the individual file archiving. The file is first moved to the cloud enabled file system, and then automatically pushed to the cloud based on the block storage the file system is built on.

More particularly, a data storage system is disclosed that includes a set of local data storage devices as well as network interface circuitry providing an interface to a cloud storage service. Processing circuitry is configured and operative to:

(1) form a first storage pool and associated first storage objects using first pool units of storage from the first storage pool, the first storage pool using the local data storage devices (e.g., EFD/SAS devices) for underlying real storage, the first storage objects including both file-oriented objects and block-oriented objects;

(2) form a second storage pool and associated second storage objects using second pool units of storage from the second storage pool, the second storage pool using the cloud storage service for underlying real storage; and (3) execute one or more of a tiering process and a backup process by which the first storage objects are migrated or copied to corresponding ones of the second storage objects for persistent storage by the cloud storage service.

In some embodiments, the processing circuitry is further configured and operative to provide a cloud interface to the cloud storage service, the cloud interface providing an internal device representation of the cloud storage service, and wherein the second pool units of storage are fixed-size extents divided out of the internal device representation.

In some embodiments, the processing circuitry includes a device cache layer for caching data of the local data storage devices as well as the cloud storage service, and wherein the first and second pool units of storage are provided out of the device caching layer.

In some embodiments, the network interface circuitry further provides an interface to a client network over which the data storage device is presented to network clients as network attached storage. The network attached storage presented to the network clients may include transactional network-attached storage using file-type access of application-defined storage objects, where the transactional network-attached storage can be storage of virtualized storage objects used by virtual-computing components on the network clients. In one example of this type, the virtualized storage objects include virtual machine disks.

In some embodiments, the tiering process includes moving a production storage object from the first storage pool to a secondary object in the second storage pool, maintaining a link to enable retrieval of the secondary object upon attempted access to the production storage object by a network client. The processing circuitry may be further configured and operative to form a policy engine used to maintain and enforce explicit policies for handling storage objects according to the tiering process.

In some embodiments, the backup process includes creating snapshot copies of production storage objects from the first storage pool, the snapshot copies being created from the second storage pool. This ability can be used to increase a limit placed on the number of allowed snapshots of objects stored in the local devices.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

A data storage system provides extended services such as tiering, migration, etc. in a unified manner for both file-type and block-type objects using a cloud enabled storage pool. This approach gives a system owner/administrator maximum flexibility in archiving and access policies while keeping the setup and management to a minimum. In the block use case, a logical device or unit (LUN) is created in the cloud enabled storage pool and used as a target for archiving block data from a production LUN defined on a separate storage pool. In a file use case, a file system is created in the cloud enabled storage pool and used as a target for archiving of files of a production file system. The file is first moved to the cloud enabled file system, and the data is then pushed to cloud storage on which the cloud enabled file system is built. Other use cases are shown as described.

Figure 1:
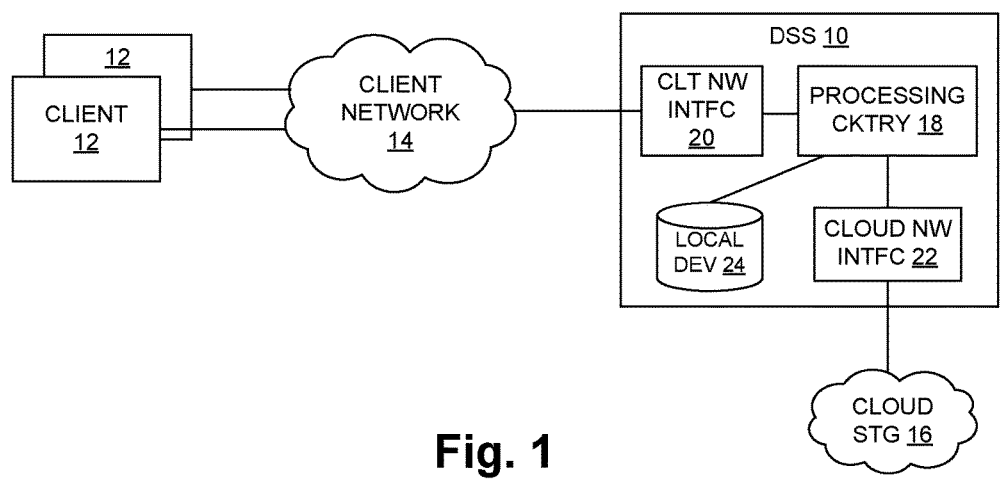
FIG. 1 is a block diagram of a data processing system.

FIG. 1 shows a data processing system including a data storage system (DSS) 10 connected to a set of client computers (CLIENT) 12 by a network shown as a client network 14, and also connected to a cloud storage service (CLOUD STG) 16. The data storage system 10 includes processing circuitry 18, a client network interface (CLT NW INTFC) 20, a cloud network interface (CLOUD NW INTFC) 22, and local-based secondary storage devices (LOCAL DEV) 24 such as magnetic disk drives, Flash-based storage devices, etc.

The network interfaces 20, 22 are specialized hardware components that translate between an internal data bus (such as PCMCIA, for example) and the respective network 14, 16. The processing circuitry 18 generally includes one or more processors, memory, and I/O interface circuitry interconnected by data interconnections such as one or more high-speed data buses, where the I/O interface circuitry provides hardware connections to the network interfaces 20, 22 as well as the local devices 24. In operation, the memory of the processing circuitry 18 stores data and instructions of system software (e.g., operating system) and one or more application programs which are executed by the processor(s) to cause the data storage system 10 to function in a software-defined manner. In particular, the various functionality of the data storage system 10 described below may be realized by the processing circuitry 18 executing such system software and application program(s).

The data storage system 10 provides remote (or distributed) data storage services to the clients 12 via the client network 14. In some embodiments, the data storage system 10 provides so-called network attached storage or NAS, which may be traditional NAS (supporting a file system view and conventional file-system operations) or so-called transactional NAS (e.g., database, virtualized storage, etc.). In such a case the client network 14 is typically a TCP/IP network, and the data storage system 10 presents one or more user-level file systems to the clients 12. In one case, the data storage system 10 provides storage resources as specialized objects of a virtual-computing environment, such as so-called virtual machine disks (VMDKs) of the type used in a VMWare® environment for example. Either alternatively or in addition, the data storage system 10 may provide storage in the form of block-structured logical storage devices, also referred to as "LUNs" or "volumes", and uses a suitable block-oriented protocol on the client network 14. In this case the client network 14 may also be a TCP/IP network with the block-oriented protocol (such as iSCSI) layered above the TCP/IP layer, or it may be realized as a so-called storage area network or SAN and utilize a native storage-oriented protocol such as FiberChannel.

The cloud storage service 16 is provided by one or more cloud service providers as generally known in the art. One example is the Simple Storage Service (S3) from Amazon. To utilize the cloud storage service 16, the data storage system 10 employs an appropriate protocol or API on the connection thereto. In the case of the S3 service, a proprietary S3 protocol is employed. The protocol or API dictates the manner in which storage resources are presented to the data storage system 10. In the case of the S3 service and S3 protocol, storage is organized into abstract file-like units referred to as "objects". The data storage system 10 both stores and retrieves storage objects such as files, file systems, and LUNs to/from the cloud storage 16 as respective objects. As described below, the data storage system 10 may implement an object cache in order to speed access to data storage in the cloud storage 16.

Figure 2:
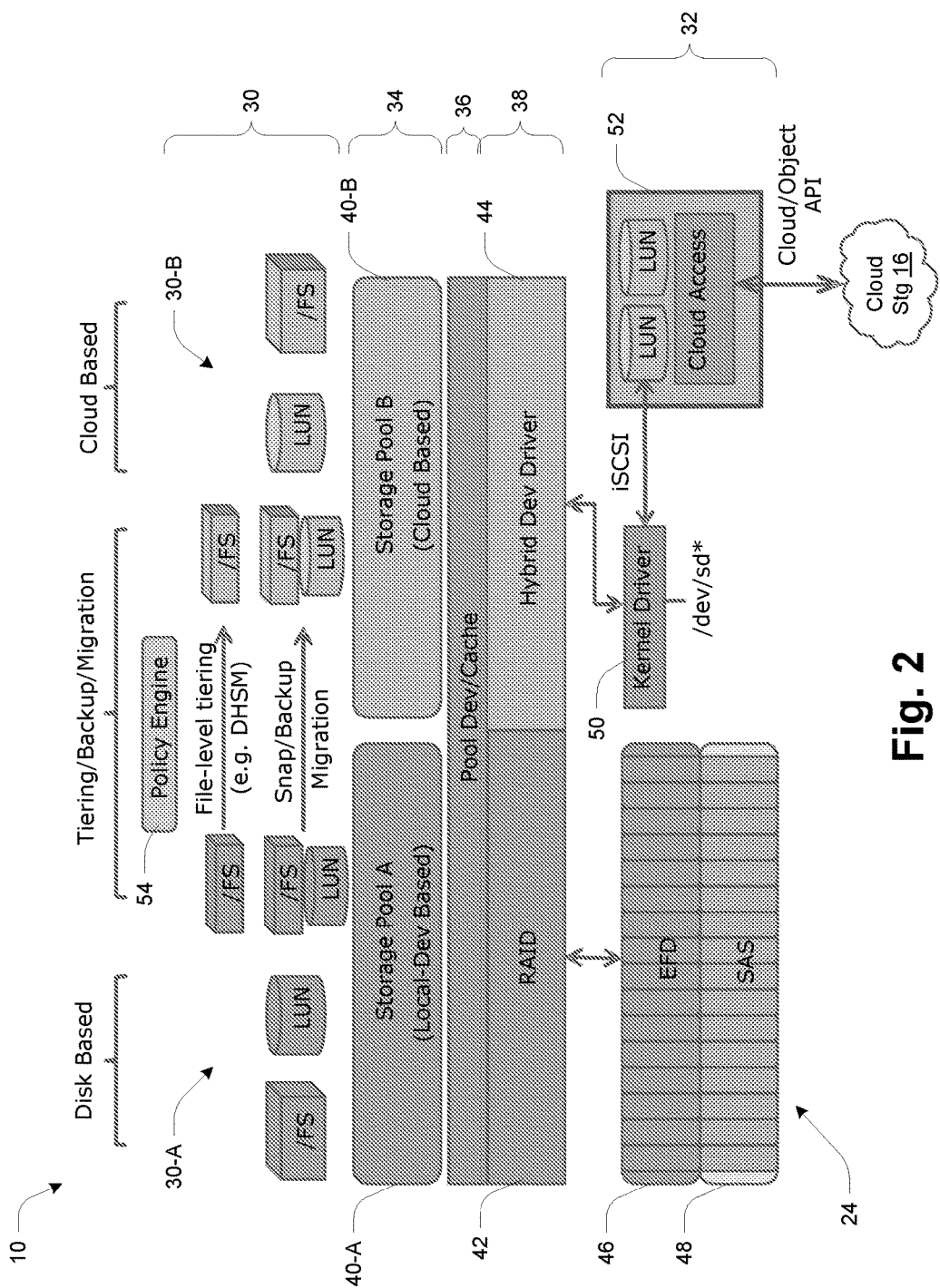
FIG. 2 is a functional block diagram of a data storage system.

FIG. 2 presents functional organization of the data storage system 10. As noted above, the various functional components are generally realized by execution of computer program instructions by the processing circuitry 18. The vertical direction represents data flow between client-visible storage objects 30 (at top) and a bottom-most physical storage layer 32 provided by local devices 24 and the cloud service 16. The client-visible storage objects 30 are shown as file systems (/FS) and logical devices (LUNs). Intervening layers include a storage pool layer 34, a pool device/cache layer 36; and a driver layer 38. The horizontal direction represents division of storage objects 30 into "local-device based" objects 30-A (at left) based on the local physical storage 24 and "cloud based" objects 30-B (at right) based on the cloud storage service 16. The pool device/cache layer 36 is shared by both sides. The pool layer 34 is divided into separate storage pools 40-A, 40-B for the local-device-based and cloud-based objects 30-A, 30-B respectively. The driver layer 38 includes a RAID driver 42 for the local devices 24 and a separate "hybrid device" driver 44 for the cloud storage 16. In one example the hybrid device driver 44 is a driver for so-called "Fusion" storage devices which implement internal tiering.

In the illustrated arrangement, the local devices 24 include enterprise flash drives (EFDs) 46 and serial-attached SCSI (SAS) drives 48, which provide the underlying physical storage for storage pool 40-A. On the cloud side, components including a kernel driver 50 and cloud interface component 52 collectively provide the connection to the cloud storage 16, using an internal representation of cloud-stored objects as SCSI LUNs as shown. Both the storage pool 40-A as well as 40-B may be structured as collections of fixed-sized extents of logical storage. In one example, the internally facing LUNs provided by the local devices 24 and cloud interface component 52 are divided into extents termed "slices" that may be 256 MB in size, for example. Storage is allocated out of each pool 40-A, 40-B in units of slices.

Between the two sides (local-device-based and cloud-based) are one or more internal services of the data storage system 10 that in some manner utilize the cloud-based devices 30-B to realize extended services in relation to the local-device-based devices 30-A. In other words, the local-device-based devices 30-A can generally be viewed as the main or primary production devices that are the primary targets of application I/O from the clients 12, while the cloud-based devices 30-B can be viewed as background or secondary devices that are in some manner related to corresponding primary local-device-based devices 30-A. Examples of such extended services include tiering (typically file-level), snapshot (SNAP) or backup (file level or LUN/device level), and migration (file level or LUN/device level). Because the B-side storage pool 40-B provides units of storage for both file systems and LUNs among the storage objects 30-B, there is effectively a single or unified cloud-based mechanism for supporting such extended services for both file- and block-type data.

As shown, the data storage system 10 may include a policy engine 54 serving as a source of explicit policies dictating the use of these services. Examples are discussed below.

Figure 3:
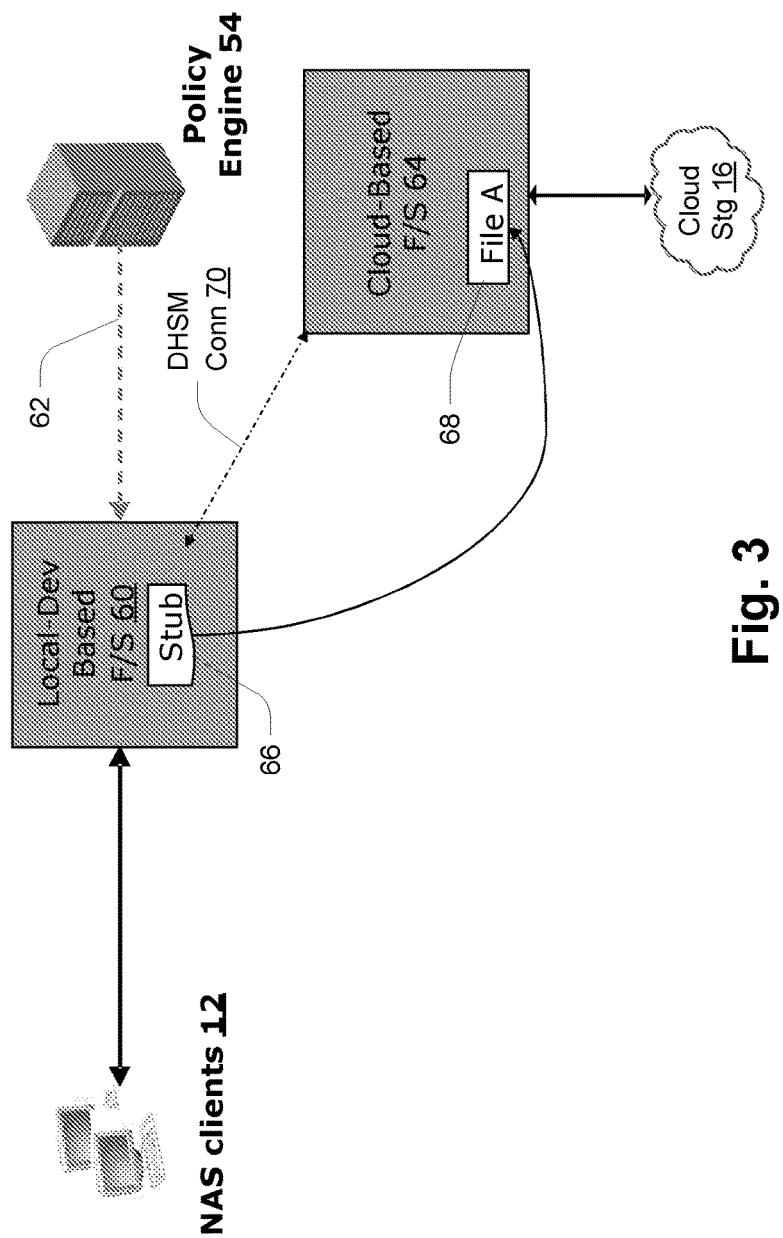
FIG. 3 is a schematic depiction of a tiering or distributed hierarchical storage management (DHSM) use case.

FIG. 3 illustrates an example of operation, in particular with reference to tiering, which is also referred to as "distributed hierarchical storage management" or DHSM. The policy engine 54 monitors the contents and usage of the production file system (shown as local-device-based F/S) 60 in relation to predetermined policies. In one example, a policy may specify that a file is to be archived after some period has elapsed without the file having been accessed. This period might be on the order of months for example. Using a file mover API 62, the policy engine 54 signals to the data storage system 10 that a file "File A" is to be archived. The data storage system 10 (and specifically, a tiering or DHSM component of the data storage system 10) copies File A into an archive copy of the production F/S 60 built on top of the cloud storage pool 40-B, shown as "cloud-based F/S" 64, and replaces File A in the local-device-based F/S 60 with a stub 66 that points to the archived copy 68 of File A in the cloud-based F/S 64. For this purpose an internal connection between the local-device-based F/S 60 and the cloud-based F/S 64, shown as a DHSM connection 70, is used. In subsequent use, when a NAS client 12 accesses File A, the local-device-based F/S 60 encounters the stub 62 and uses it to initiate retrieval of File A from the cloud-based F/S 64. The local-device-based F/S 60 restores the retrieved File A and then satisfies the user I/O involving File A. File A may again be archived at some later time when the conditions of an archive policy are met.

In addition to the tiering use case as discussed above, the data storage system 10 can also support other extended services into the cloud. For snapshotting of files or LUNs, snapshot copies can be provided out of the storage pool 40-B and thus automatically use the cloud storage 16 for physical storage. This may enable the system to support a much larger number of snapshots than might otherwise be supported if all snapshots used local storage resources. A typical system-imposed limit might be 256 snaps of a given primary storage object, but that limit might be increased to thousands or tens of thousands based on the use of cloud storage 16. One particular use for file-level snapshotting is to capture snaps of VMDKs in a virtual-computing environment.

Figure 4:
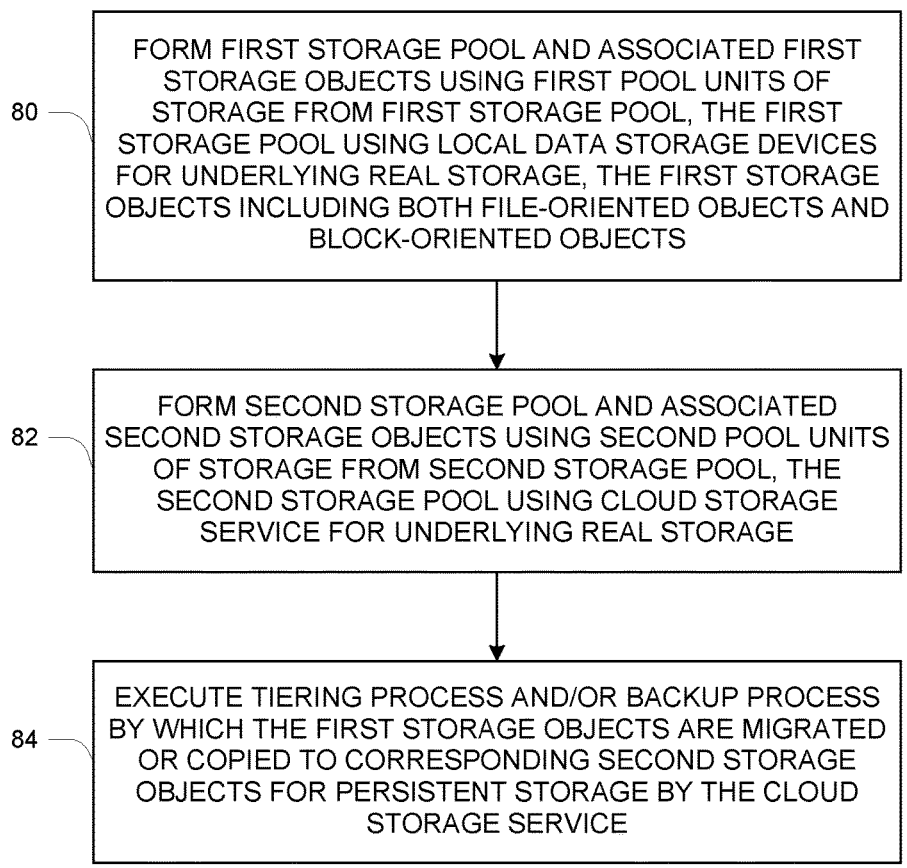
FIG. 4 is a high-level flow diagram of operation of a data storage system.

FIG. 4 provides a high-level flow of operation of the data storage system 10 under the control of the processing circuitry executing computer program instructions as outlined above.

At 80, the data storage system 10 forms a first storage pool (e.g., 40-A) and associated first storage objects (e.g., 30-A) using first pool units of storage from the first storage pool. The first storage pool uses local data storage devices (e.g., 24) for underlying real storage. The first storage objects including both file-oriented objects (e.g., files systems/FS) and block-oriented objects (e.g., LUNs).

At 82, the data storage system 10 forma a second storage pool (e.g., 40-B) and associated second storage objects (e.g., 30-B) using second pool units of storage from the second storage pool. The second storage pool uses a cloud storage service (e.g., 16) for underlying real storage.

At 84, the data storage system 10 executes either/both a tiering process and a backup process by which the first storage objects are migrated or copied to corresponding ones of the second storage objects for persistent storage by the cloud storage service.

While various embodiments of the invention have been particularly shown and described, it will be understood by those skilled in the art that various changes in form and details may be made therein without departing from the spirit and scope of the invention as defined by the appended claims.

What is claimed is:

1. A data storage system, comprising:
a set of local data storage devices;
network interface circuitry providing an interface to a cloud storage service; and
processing circuitry configured and operative to:
(1) form a first storage pool and associated first storage objects using first pool units of storage from the first storage pool, the first storage pool using the local data storage devices for underlying real storage, the first storage objects including both file-oriented objects and block-oriented objects;
(2) form a second storage pool and associated second storage objects using second pool units of storage from the second storage pool, the second storage pool using the cloud storage service for underlying real storage;
(3) execute one or more of a tiering process and a backup process by which the first storage objects are migrated or copied to corresponding ones of the second storage objects for persistent storage by the cloud storage service; and
(4) provide a cloud interface to the cloud storage service, the cloud interface providing an internal device representation of the cloud storage service,
wherein the second pool units of storage are fixed-size extents divided out of the internal device representation, and the first and second storage pools are provided at a storage pool layer,
and wherein the processing circuitry is further configured and operative to provide a driver layer interposed between the storage pool layer and a physical storage layer containing the local data storage devices and the cloud interface, the driver layer including (1) a redundant array of independent disks (RAID) driver for the local data storage devices and (2) a hybrid device driver accessing cloud-stored data using the internal device representation of the cloud storage service.

2. The data storage system of claim 1, wherein the processing circuitry includes a device cache layer for caching data of the local data storage devices as well as the cloud storage service, and wherein the first and second pool units of storage are provided out of the device caching layer.

3. The data storage system of claim 1, wherein the network interface circuitry further provides an interface to a client network over which the data storage device is presented to network clients as network attached storage.

4. The data storage system of claim 3, wherein the network attached storage presented to the network clients includes transactional network-attached storage using file-type access of application-defined storage objects.

5. The data storage system of claim 4, wherein the transactional network-attached storage is storage of virtualized storage objects used by virtual-computing components on the network clients.

6. The data storage system of claim 5, wherein the virtualized storage objects include virtual machine disks.

7. The data storage system of claim 1, wherein the tiering process includes moving a production storage object from the first storage pool to a secondary object in the second storage pool, maintaining a link to enable retrieval of the secondary object upon attempted access to the production storage object by a network client.

8. The data storage system of claim 7, wherein the processing circuitry is further configured and operative to form a policy engine used to maintain and enforce explicit policies for handling storage objects according to the tiering process.

9. The data storage system of claim 1, wherein the backup process includes creating snapshot copies of production storage objects from the first storage pool, the snapshot copies being created from the second storage pool.

10. A method of operating a data storage system having a set of local data storage devices and network interface circuitry providing an interface to a cloud storage service, comprising:

forming a first storage pool and associated first storage objects using first pool units of storage from the first storage pool, the first storage pool using the local data storage devices for underlying real storage, the first storage objects including both file-oriented objects and block-oriented objects;

forming a second storage pool and associated second storage objects using second pool units of storage from the second storage pool, the second storage pool using the cloud storage service for underlying real storage;

executing one or more of a tiering process and a backup process by which the first storage objects are migrated or copied to corresponding ones of the second storage objects for persistent storage by the cloud storage service, and providing a cloud interface to the cloud storage service, the cloud interface providing an internal device representation of the cloud storage service, wherein the second pool units of storage are fixed-size extents divided out of the internal device representation, and the first and second storage pools are provided at a storage pool layer, and wherein the method further includes providing a driver layer interposed between the storage pool layer and a physical storage layer containing the local data storage devices and the cloud interface, the driver layer including (1) a redundant array of independent disks (RAID) driver for the local data storage devices and (2) a hybrid device driver accessing cloud-stored data using the internal device representation of the cloud storage service.

11. The method of claim 10, further including maintaining a device cache layer for caching data of the local data storage devices as well as the cloud storage service, and wherein the first and second pool units of storage are provided out of the device caching layer.

12. The method of claim 10, wherein the network interface circuitry further provides an interface to a client network over which the data storage device is presented to network clients as network attached storage.

13. The method of claim 12, wherein the network attached storage presented to the network clients includes transactional network-attached storage using file-type access of application-defined storage objects.

14. The method of claim 13, wherein the transactional network-attached storage is storage of virtualized storage objects used by virtual-computing components on the network clients.

15. The method of claim 14, wherein the virtualized storage objects include virtual machine disks.

16. The method of claim 10, wherein the tiering process includes moving a production storage object from the first storage pool to a secondary object in the second storage pool, maintaining a link to enable retrieval of the secondary object upon attempted access to the production storage object by a network client.

17. The method of claim 16, further including using a policy engine to maintain and enforce explicit policies for handling storage objects according to the tiering process.

18. The method of claim 10, wherein the backup process includes creating snapshot copies of production storage objects from the first storage pool, the snapshot copies being created from the second storage pool.

19. The data storage system of claim 1, wherein the second storage objects are file-oriented objects and block-oriented objects to which the corresponding first storage objects are migrated or copied for persistent storage by the cloud storage service, and wherein the first storage objects and the second storage objects are client-visible storage objects visible to external clients of the data storage system via a storage-oriented protocol of a client network via which the external clients access the data storage system.

20. The method of claim 10, wherein the second storage objects are file-oriented objects and block-oriented objects to which the corresponding first storage objects are migrated or copied for persistent storage by the cloud storage service, and wherein the first storage objects and the second storage objects are client-visible storage objects visible to external clients of the data storage system via a storage-oriented protocol of a client network via which the external clients access the data storage system.

* * * * *